United States Patent
Morley et al.

(10) Patent No.: US 6,631,485 B1
(45) Date of Patent: Oct. 7, 2003

(54) METHODS AND APPARATUS FOR DATA STORAGE ON MAGNETIC MEDIA INCLUDING ERROR CORRECTION CODES

(75) Inventors: Stephen Morley, Bristol (GB); Robert Williams, Bristol (GB); Shinya Osaki, Kanagawa-ken (JP); Mark Robert Watkins, Bristol (GB); Toshiyuki Hirose, Tokyo (JP)

(73) Assignees: Hewlett-Packard Development Company, L.C., Houston, TX (US); Sony Corporation, Tokyo (JP)

( * ) Notice: Subject to any disclaimer, the term of this patent is extended or adjusted under 35 U.S.C. 154(b) by 0 days.

(21) Appl. No.: 09/600,306

(22) PCT Filed: Jan. 16, 1998

(86) PCT No.: PCT/GB98/00055

§ 371 (c)(1),
(2), (4) Date: Jan. 25, 2001

(87) PCT Pub. No.: WO99/36913

PCT Pub. Date: Jul. 22, 1999

(51) Int. Cl.⁷ .............................................. G06F 11/00
(52) U.S. Cl. ..................... 714/701; 714/752; 360/53
(58) Field of Search ................................. 714/701, 752, 714/758, 799, 800, 807, 784; 360/53, 48

(56) References Cited

U.S. PATENT DOCUMENTS

| | | |
|---|---|---|
| 4,653,051 A | 3/1987 | Sugimura et al. |
| 5,359,468 A | 10/1994 | Rhodes et al. |
| 5,598,301 A | 1/1997 | Suzuki et al. |

FOREIGN PATENT DOCUMENTS

| | | |
|---|---|---|
| EP | 0 551 973 A | 7/1993 |
| WO | 93 03437 A | 2/1993 |

*Primary Examiner*—Phung M. Chung

(57) ABSTRACT

In a digital data storage system providing two or more levels of interleaved Reed-Solomon error correction coding together with a track checksum, the track checksum is calculated according to an algorithm which has no correlation with the Reed-Solomon codeword generation rules. This allows miscorrections at the C2 correction level to be determined reliably thereby enhancing the correction rate. Also disclosed is a system which uses the enhanced ability to identify C2 miscorrections, to mark C2 miscorrections to the third level of error correction thereby allowing double error correct at the third level.

24 Claims, 4 Drawing Sheets

| Track name | A | | B | |
|---|---|---|---|---|
| Byte name | lower | upper | lower | Upper |
| Bit number | 8 7 6 5 4 3 2 1 | 8 7 6 5 4 3 2 1 | 8 7 6 5 4 3 2 1 | 8 7 6 5 4 3 2 1 |
| Header 0 | 0 0 0 0 DF-ID | LF-ID | 0 0 0 0 DF-ID | LF-ID |
| 1 | $D_0$ | $D_1$ | $D_{8\,734}$ | $D_{8\,735}$ |
| 2 | $D_2$ | $D_3$ | $D_{8\,736}$ | $D_{8\,737}$ |
| 3 | $D_4$ | $D_5$ | $D_{8\,738}$ | $D_{8\,739}$ |
| ⋮ | ⋮ | ⋮ | ⋮ | ⋮ |
| 4 366 | $D_{8\,730}$ | $D_{8\,731}$ | $D_{17\,464}$ | $D_{17\,465}$ |
| 4 367 | $D_{8\,732}$ | $D_{8\,733}$ | $D_{17\,466}$ | $D_{17\,467}$ |

↑ Word number

METHODS AND APPARATUS FOR DATA STORAGE ON MAGNETIC MEDIA INCLUDING ERROR CORRECTION CODES

FIELD OF THE INVENTION

This invention relates to apparatus and methods for storing data on magnetic media and in particular to such apparatus and methods which implement at least two levels of error correction.

BACKGROUND OF THE INVENTION

There is a continually increasing demand for magnetic data storage devices capable of storing large volumes of digital data, such as computer data on magnetic tape by means of the DDS (Digital Data Storage) Format. In a DDS read/write mechanism using the above format, data are recorded in helical scan fashion on an elongate recording media, comprising a tape coated with a magnetic medium, by a rotating drum carrying one or more electromagnetic heads. The tape is moved by a motor-driven capstan along a path extending between two spools or reels and wrapped partially around the drum. The plane of rotation of the heads of the drum is disposed at an angle to the plane of movement of the tape, so that each head traverses the tape along successive tracks extending across the width of the tape at an angle to its centre line. The mechanism includes appropriate circuitry for encoding data into signals suitable for recording onto tape, including error-detection and correction codes, and for conditioning those signals into a form optimally matched to the characteristics of the recording media. For data retrieval, additional circuitry is provided for detecting magnetic field variations stored on the tape, deriving corresponding signals, conditioning those signals into a form for subsequent processing, decoding the encoded data and detecting and correcting errors.

A recent development has been the DDS3 format (defined in ECMA Standard ECMA-236 dated June 1996 "3,81 mm Wide Magnetic Tape Cartridge for Information Interchange—Helical Scan Recording—DDS-3 Format using 125 m Length Tapes", the entire contents of which are incorporated herein by reference). In DDS3, error checking and detection is achieved by using a multilevel interleaved Reed-Solomon code providing at least two levels (C1, C2) and optionally a third level (C3) of error correction coding (ECC). In addition, to provide a final data check on reading, track checksums are generated corresponding to each track of data to be written on tape, and stored in the fragment headers, several of which are incorporated in each track. Thus on reading, the track checksum algorithm is applied to the data bytes retrieved from the tape and if this tracksum does not agree with that calculated and stored when the tape was recorded, the track is rejected.

SUMMARY OF THE INVENTION

It is desirable that the track checksum operates to reject as large a proportion as possible of failed tracks (that is ones containing either uncorrectable or miscorrected codewords—as to be described below). Although the existing track checksum operates reasonably well, the Applicant has discovered that there is an unexpected yet significant flaw in this system, such that the track checksum does not identify a large proportion of miscorrections. The Applicant's analysis has revealed that, in a miscorrected codeword in which the "corrections" occur in the data bytes only of the codeword, the track checksum will not reveal this failure.

This phenomenon arises because the codewords are constructed to have the inherent property that the result of XORing all the bytes together (both data and parity) is zero. Also in DDS3 the track checksums are calculated by XORing the data bytes of the relevant track.

Given that the bytes of a good (or miscorrected) codeword XOR to zero, if the parity bytes of a particular good or miscorrected codeword XOR to, say, a binary value A, the data bytes must also XOR to the same value A (so that the data bytes and parity bytes together XOR to zero). In a miscorrection of this particular codeword, in which the "corrections" are contained in the data bytes only, the parity bytes will XOR to A as previously because they are unchanged. Even though the data bytes have changed, the data bytes will still XOR to A to fulfil the requirement that the miscorrection XORs to zero. However, the data bytes all contribute to the same checksum (also the result of an XOR operation) the track checksum will remain unchanged, and so, for this type of miscorrection, due to the correlation between the inherent XOR property of the codeword and the operation used to calculate the checksum, the track checksum will not reveal a miscorrected codeword in which all the "corrections" appear in the data bytes.

The Applicants have determined that modifying the track checksum algorithm so that is does not correlate with the XOR operation provides a reliable method for detecting miscorrections in the previous codeword. The ability to detect miscorrections reliably also has important beneficial consequences when third level C3 correction is implemented.

In the past the Applicants have attempted to use the track checksum to identify C2 codeword failures and mark them accordingly. Because of the interleaved and multi-level structure of the error correction coding, if a codeword fails at the C1 or C2 levels (in a three level system), knowing the position of that codeword in the array identifies in the codewords of the next level the locations of a number of bytes which are suspect. The structure of the error correction coding means that the bytes in a particular codeword map to positions in the subsequent codewords according to a known mapping. Thus a failed codeword at the C2 stage can be used to flag particular bytes in the C3 codeword to the C3 correction algorithm so that these are treated as "erasures" rather than errors.

Thus when a complete C2 codeword is marked as a failure, the corresponding data byte locations making up the codeword may be determined so that o the next, C3, level the location of the errors is known. A Reed-Solomon code having N parity bytes is capable of correcting 'e' errors and 'v' erasures, where $2e+v \leq N$, and an erasure is a bad byte in a known location. A typical C3 correction codeword has just two parity bytes (i.e. N=2) and so the C3 correction algorithm can either correct a single error (e=1) or two erasures (v=2). Where two corrections are made this is referred to as double error correction. Thus the ability reliably to mark miscorrected C2 codewords as erasures would mean that the C3 algorithm could perform double error correction. Until now, the absence of a reliable method of detecting miscorrections has meant that it has not been realistic to attempt double error correction at the C3 stage.

Accordingly, the Applicants have provided a method and apparatus in which the track checksum provides considerably more reliable checking of miscorrections in one aspect this invention provides apparatus for storing a stream of data records on magnetic media, said apparatus including:

group formatting means for grouping said data records into groups of data bytes;

sub-group processing means for dividing each of said groups into subgroups, wherein each subgroup comprises data bytes corresponding to one or more data tracks;

track checksum calculating means for calculating one or more checksums for the or each data track, means for transforming each subgroup into at least one respective array, each corresponding to a data track, first error correction coding encoding means for encoding columns of the or each array to provide first (C1) ECC codewords comprising data bytes and parity bytes;

second error correction coding encoding means for encoding rows of the or each array to provide second (C2) ECC codewords comprising data bytes and parity bytes;

wherein said track checksum calculating means calculates a respective track checksum for the or each track such that, on decoding of said ECC codewords, a miscorrected codeword in which the miscorrections are in the data bytes only has no more than a substantially random probability of providing the same contribution to the corresponding track checksum as the corresponding original codeword.

It is emphasized that the terms "first" and "second" are not intended to require that the first error correction coding means operates before the second error correction coding means.

In this way, selecting a track checksum algorithm which has no correlation with the codeword generation rules means that the track checksum is more reliable for detecting miscorrections than the previous correction algorithm. In turn this makes it possible to use the track checksums to mark miscorrected codewords with considerably enhanced correction rates.

Preferably said first and second error correction coding encoding means apply respective Reed-Solomon coding algorithms.

There are many algorithms which may be used to generate the track checksum; in one particular example where Reed-Solomon codewords having a root at $\alpha^0$ are used, the track checksum may be calculated on the basis of the arithmetic addition of the data bytes in the relevant track.

The codewords and the checksums may be processed in a variety of ways prior to writing to tape, but it is preferred for the apparatus to include means for transforming said encoded arrays to provide for each track a plurality of data fragments for being written on said magnetic media, and fragment header means for providing each of said data fragments with a fragment header, wherein at least some of said fragment headers include data bytes identifying the corresponding track checksum for the current track.

The provision of a more reliable track checksum scheme for detecting miscorrections facilitates double error correction at a third level. Accordingly, the apparatus preferably includes third error correction encoding means for computing codewords from respective corresponding byte positions across each of the tracks making up a group.

The invention also extends to a method for storing a stream of data records on magnetic media, which comprises:

grouping said data records into groups of data bytes, dividing each of said groups into subgroups of data bytes, each subgroup corresponding to one or more data tracks;

calculating and storing one or more track checksums for the or each data track;

transforming each subgroup into at least one respective array each corresponding to a data track; encoding columns of said the or each array to form first error correction coding codewords comprising data bytes and parity bytes;

encoding rows of said the or each array to form second error correction coding codewords comprising data bytes and parity bytes;

wherein said track checksum calculating means calculates a respective track checksum for the or each track such that, on decoding of said correction coding codewords, a miscorrected codeword in which the miscorrections are in the data bytes has no more than a substantially random probability of providing the same contribution to the corresponding track checksum as the corresponding original codeword.

The invention also extends to a method for reading data stored in accordance with the above method, which comprises retrieving data from tape, extracting therefrom said track checksums, decoding the codewords to obtain data bytes for each track, computing a track checksum for the decoded data bytes, and flagging a failure if said checksums do not agree.

Preferably said data includes three levels of error correction, and said track checksum is used after the second level of error correction to flag any second codeword failures thereby to identify and mark as erasures to the third level correction algorithm any data bytes in the third level codewords which correspond to a second level codeword failure.

Whilst the invention has been described above it extends to any inventive combination of the features set out above or in the following description.

BRIEF DESCRIPTION OF THE DRAWINGS

The invention may be performed in various ways and an embodiment thereof will now be described in detail, reference being made to the accompanying drawings, in which.

DETAILED DESCRIPTION OF PREFERRED EMBODIMENT

The embodiment of tape storage system described below is based on the DDS3 standard outlined in ECMA 236, including a third level (C3) correction algorithm and a modified track checksum algorithm which provides a checksum which is a more reliable indicator of C2 miscorrections. The track checksum determined according to the modified algorithm may be used as a final check of the primary data after C2 correction (if C3 correction is not used) or after C3 correction. As to be described in more detail below, in the case where C3 correction is not used, use of the modified track checksum algorithm provides a much more reliable method for detecting C2 miscorrections as a final data check. In the case where C3 correction is used, the ability reliably to check for and mark C2 miscorrections means that both C2 uncorrectable codewords and C2 miscorrections can be marked as erasures to C3 to enable the full power of the C3 correction code to be used.

Figure 1:
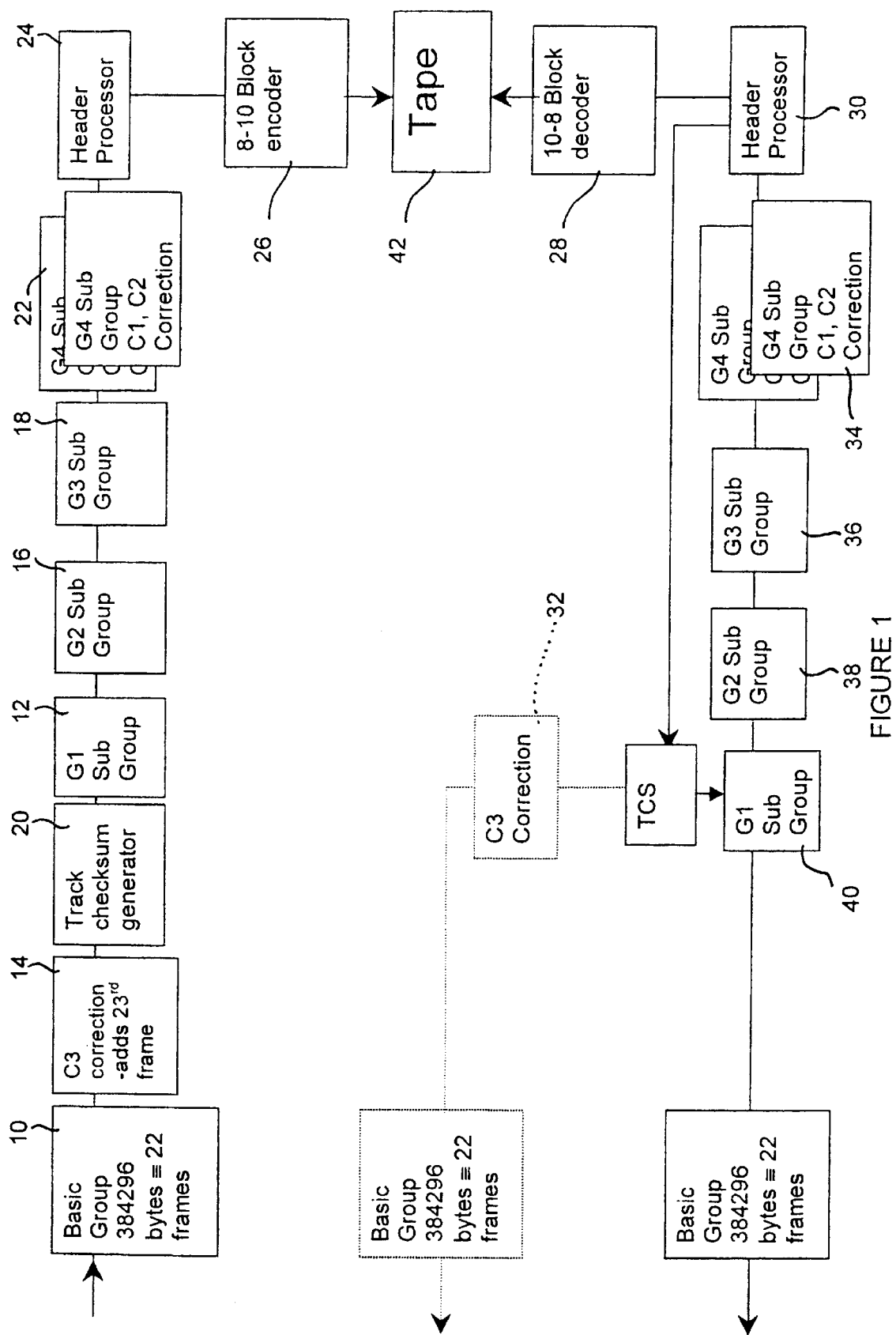
FIG. 1 is a schematic block pipeline diagram representing storage and retrieval of information from magnetic tape using a modified DDS3 format in accordance with this invention.

Referring initially to FIG. 1, a stream of Primary Data to be stored on the tape is grouped into Basic Groups of 384 296 bytes, by a Basic Group Module 10. Following the Basic Group Module 10, there is a C3 correction processor 14 and a track checksum generator 20. For convenience, since the C3 correction processor 14 and the tracksum generator 16 are more easily described using the byte nomenclature introduced by the Sub-Groups, these components are described in greater detail below.

When a Basic Group has been completed, it is split by the G1 module 12 into 22 G1 Sub-Groups each of 17648 bytes numbered from 0 to 17 467. Each G1 Sub-Group has a running number in the range of from 1 to 22 (see FIG. 2). An Error Correction Code (ECC3) processor 14 derives data from each of the 22 G1 Sub-Groups to form a 23rd G1 Sub-Group. The Error Correction Code C3 is a $GF(2^8)$ Reed-Solomon Code (46,44,3). Calculation in a $GF(2^8)$ shall be defined by:

$$G(x) = x^8 + x^4 + x^3 + x^2 + 1$$

A primitive element $\alpha$ in $GF(2^8)$ is 00000010.

The interleave depth of ECC3 shall be one track. The ECC bytes shall satisfy:

$$H_R \times V_R = 0$$

The generator polynomial shall be:

$$G_R(X) = \prod_{i=0}^{i=1} (x - \alpha^i)$$

$$H_R \begin{bmatrix} 1 & 1 & 1 & \ldots & 1 & 1 & 1 \\ \alpha^{45} & \alpha^{44} & \alpha^{43} & \ldots & \alpha^2 & \alpha & 1 \end{bmatrix}$$

$$V_R = \begin{bmatrix} D_{n,1} \\ D_{n+8734,1} \\ D_{n,2} \\ D_{n+8734,2} \\ \ldots \\ D_{n+8734,22} \\ R_{n,23} \\ D_{n+8734,23} \end{bmatrix}$$

n=0, 1, 2, . . . ,8 733

$D_{x,y}$ x=User data byte number in a G1 Sub-Group,
y G1 Sub-Group number
$R_{x,23}$ x=Parity byte number in The ECC2 G2 Sub-Group The Error Correction Code C3 has the capability of correcting any two tracks which are bad in a recorded data group.

Figures 2, 3:
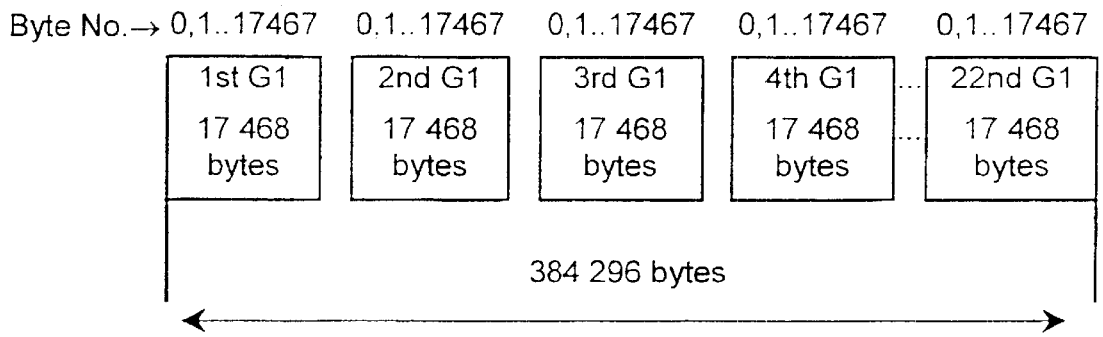
FIG. 2 illustrates the G2 Sub-Groups split from the Basic Group in the data format implemented in the DDS3 format.
FIG. 3 illustrates the G3 Sub-Groups obtained after randomisation and rearrangement of the G1 Sub-Groups.

The bytes of each G1 Sub-Group are then randomised by a G2 module 16 to form a G2 Sub-Group in which all the bytes are still numbered from $D_0$ to $D_{17467}$. Their sequence is as in the G1 Sub-Group. A G3 module 18 then operates on the G2 Sub-Groups so that each G2 Sub-Group of 17468 bytes is arranged to Group bytes $D_0$ to $D_{8733}$ of a G2 Sub-Group in track A of the G3 Sub-Group and bytes $D_{8734}$ to $D_{17467}$ in track B of the G3 Sub-Group (as seen in FIG. 3). In each track the bytes are allocated into words. The even numbered bytes are allocated to a lower byte whereas odd numbered bytes are allocated to an upper byte. The first word of each track (word number 0) contains two bytes known as the Logical Frame Identification (LFID) and the Data Frame Identification (DFID).

The DFID indicates the DDS format. The LFID indicates the Frame Number and the presence or otherwise of a 23rd frame (the C3 frame).

Each byte of a G3 Sub-Group is then identified by:
its track (A or B);
its byte name (lower or upper);
its word number (from 0 to 4367)
The following notation is used in the description below:
$A_{il}$ indicates the byte identified by the lower byte of track A in the ith word;
$A_{iu}$ indicates the byte identified by the upper byte of track A in the ith word;
$B_{il}$ indicates the byte identified by the lower byte of track B in the ith word;
$B_{iu}$ indicates the byte identified by the upper byte of track B in the ith word.

The track checksum generator 20 generates a track checksum according to an algorithm which has no correlation with the Reed-Solomon codeword generation rules. Thus the track checksum algorithm uses an arithmetic sum as the checksum for each track. The bytes in the track are added up to form a 16 bit result, with any carry over 16 bits being ignored (i.e. the sum is computed modulo $2^{16}$). So for track A, the track checksum (TCS(A)) is given by:

$$TCS(A) = [LFID] + [DFID] + \sum_{i=0}^{8733} D(i)$$

and for Track B:

$$TCS(B) = [LFID] + [DFID] + \sum_{i=8734}^{17467} D(i)$$

LFID and DIFD are the logical frame ID and the Data Format ID, which are supervisory bytes as described above in connection with the G3 Sub-Group. It will be noted that all of the Primary Data bytes in any C2 codeword within a track contribute to the same Track Checksum. The Track Checksum computation is an arithmetic sum and therefore has no correlation with the XOR operation used to calculate the C2 parity bytes. With a 16 bit arithmetic checksum, the probability of the track checksum not changing when C2 miscorrects is essentially random (i.e. $\frac{1}{2}^{16}$)=$1.5 \times 10^{-6}$.

Each G3 Sub-Group is then transformed by a G4 module 22 into G4 Sub-Groups (incorporating C1, C2 codeword generation). Each G4 Sub-Group consisting of two twin arrays as follows (see FIG. 4). A Sign, a Fragment Number and a Serial Number are allocated to each byte using the following formulae:

SIGN: $(-1)^a$

FRAGMENT NUMBER: $i(mod\ 78) + 9$

SERIAL NUMBER: $\left(2\left(u + \text{Integer}\frac{i}{78}\right)\right) - \left(\text{Integer}\ \frac{i}{78}\right)(mod\ 2)$ where Integer = the integer part of the quotient i=0 to 4 367
a=0 for the $A_{iu}$ and $A_{il}$ bytes
a=1 for the $B_{iu}$ and $B_{il}$ bytes
u=0 for the $A_{iu}$ and $B_{iu}$ bytes
u=1 for the $A_{il}$ and $B_{il}$ bytes Referring to FIG. 4 this provides two arrays named plus and minus corresponding to racks A and B. In each array each byte is identified by its Fragment Number (0 to 95) and its Serial Number (0 to 123).

Figure 4:
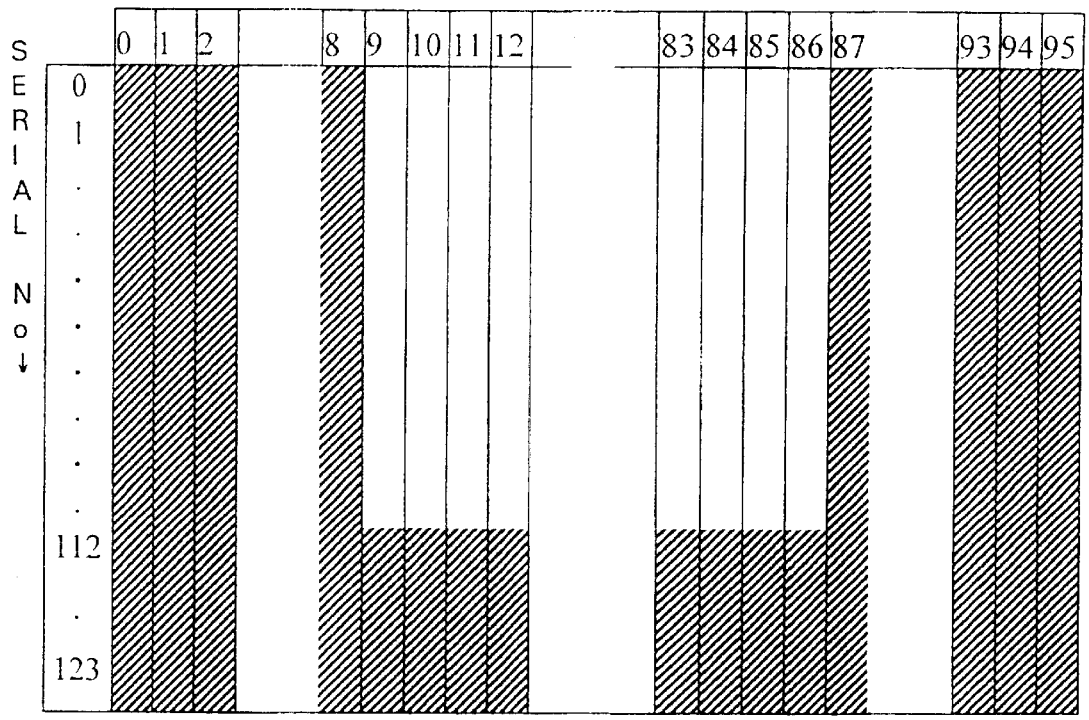
FIG. 4 illustrates the structure of the G4 Sub-Groups obtained from the G3 Sub-Groups.
Figure 4:
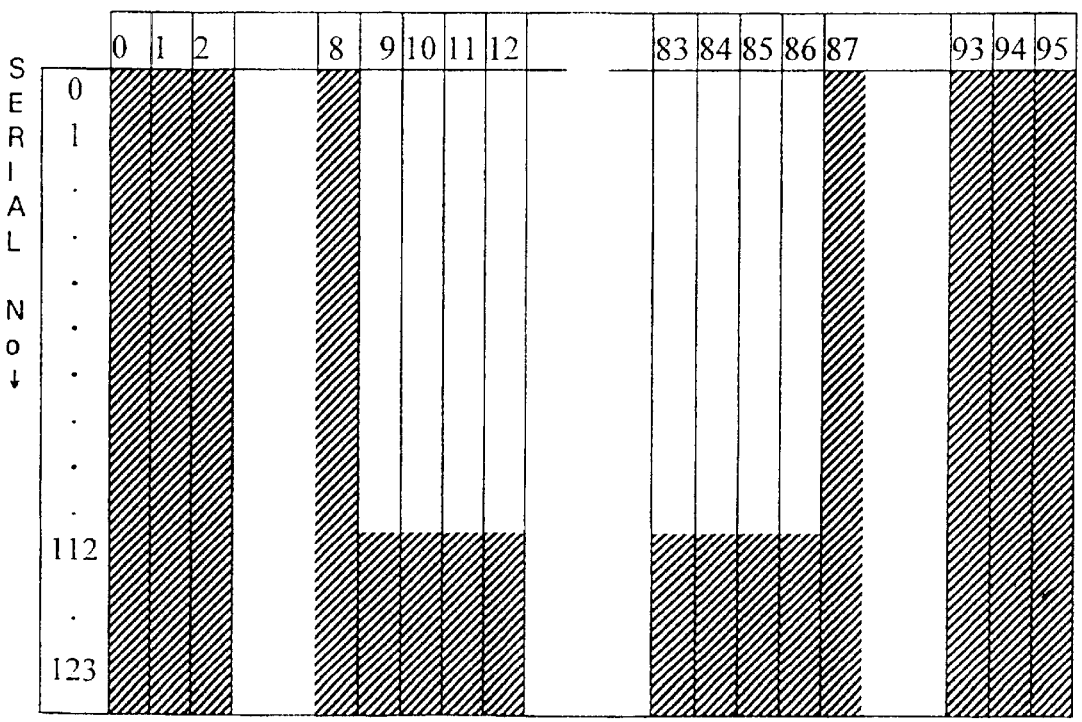

Applying the above formulae distributes data bytes into the unshaded part of the arrays seen in FIG. 4. The data bytes in the unshaded part of the table are then coded using two Reed-Solomon error detection and correction codes C1 and C2 computed over the bytes already allocated into the arrays. The C1 codewords extend in the column direction whereas the C2 codewords extend in the row direction.

The C2 bytes are computed for the byte positions with Serial Numbers in the range from 0 to 111 in each Fragment having a Fragment Number in the range of 0 to 8 or 87 to 95 from the bytes with the same Serial Number in all the other Fragments.

The C1 bytes are then computed for byte positions with Serial Numbers in the range 112 to 123 in all Fragments from all the other bytes in the same Fragment. In Fragments with a Fragment Number in the range 0 to 8 or the range 87 to 95, the C1 bytes are computed from the C2 bytes previously computed. C1 is a GF($2^8$) Reed-Solomon code (62,56,7). This expression indicates that the codeword is 62 bytes long of which 56 bytes are data bytes, and having a separation of 7 bytes. C2 is a GF($2^8$) Reed-Solomon (32, 26,7).

Calculation in a GF($2^8$) is defined by:

$$G(x) = x^8 + x^4 + x^3 + x^2 + 1$$

A primitive element a in GF($2^8$) is 00000010.

The interleave depth of C1 is two bytes; thus in any column of an array, data bytes with even Serial Numbers belong to one of the C1 codewords of that column and data bytes with odd Serial Numbers belong to the other C1 codeword in that column. The interleave depth of C2 is three Fragments and so, in any row, every third Fragment belongs to the same codewords, there being three C2 codewords in a row. The error correction code (ECC) bytes satisfy the following relationships:

$$H_P \times V_P = 0$$

$$H_Q \times V_Q = 0$$

The generator polynomials are:

$$G_P(X) = \prod_{i=0}^{i=5} (x - a^i)$$

$$G_Q(X) = \prod_{i=0}^{i=5} (x - a^i)$$

$$H_P = \begin{bmatrix} 1 & 1 & 1 & \ldots & 1 & 1 & 1 \\ a^{61} & a^{60} & a^{59} & \ldots & a^2 & a & 1 \\ a^{122} & a^{120} & a^{118} & \ldots & a^4 & a^2 & 1 \\ a^{183} & a^{180} & a^{177} & \ldots & a^6 & a^3 & 1 \\ a^{244} & a^{240} & a^{236} & \ldots & a^8 & a^4 & 1 \\ a^{50} & a^{45} & a^{40} & \ldots & a^{10} & a^5 & 1 \end{bmatrix}$$

$$H_Q = \begin{bmatrix} 1 & 1 & 1 & \ldots & 1 & 1 & 1 \\ a^{31} & a^{29} & a^{28} & \ldots & a^2 & a & 1 \\ a^{62} & a^{60} & a^{58} & \ldots & a^4 & a^2 & 1 \\ a^{93} & a^{90} & a^{87} & \ldots & a^6 & a^3 & 1 \\ a^{124} & a^{120} & a^{116} & \ldots & a^8 & a^4 & 1 \\ a^{155} & a^{150} & a^{145} & \ldots & a^{10} & a^5 & 1 \end{bmatrix}$$

($V_P$ and $V_Q$ appear on the following page).
where $P_{ij}$=C1 bytes
  $Q_{ij}$=C2 bytes
  i=Fragment Number
  j=Serial Number
For C1: k=0, 1, . . . , 95
  l=0, 1
  if k=0, 1, . . . , 8 or k=87, 88, . . . , 95, the $D_{ij}$ in $V_P$ is read as $Q_{ij}$
For C2: m=0, 1, 2
  n=0, 1, . . . , 111

Figure 5:
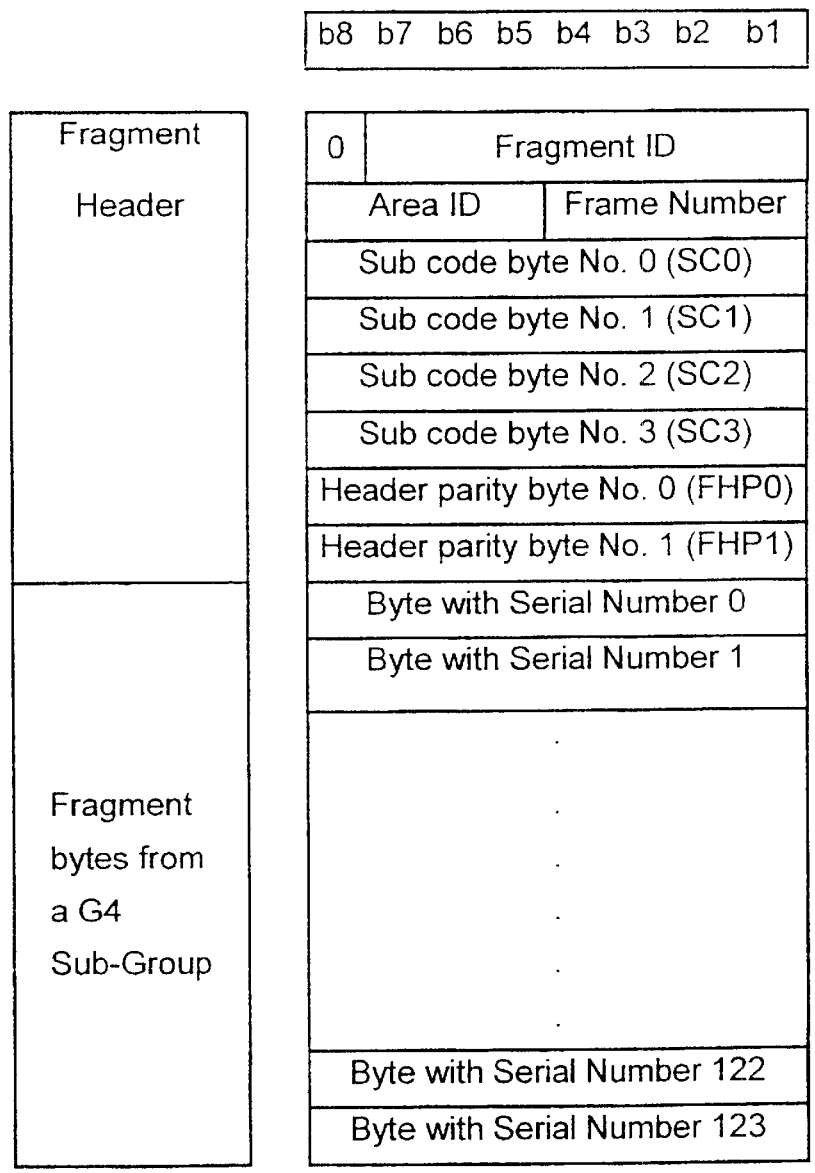
FIG. 5 illustrates the structure of a Main Data Fragment.
Figure 6:
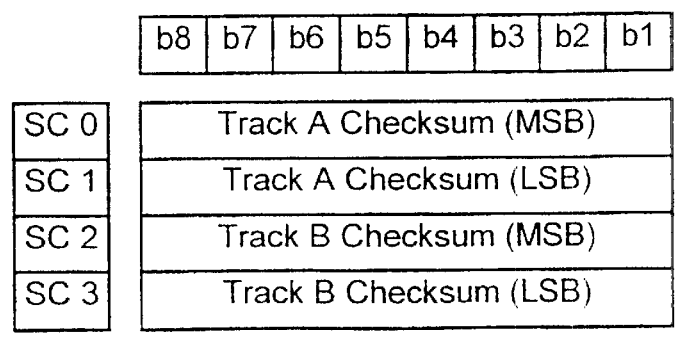
Figure 6 illustrates the structure of the Pack Item which contains the track checksums.

Each Fragment of a G4 Sub-Group is transformed by a header processor 24 into a 132-byte Main Data Fragment by prefixing an 8-byte header. The header contains control and $$V_P = \begin{bmatrix} D_{k,l} \\ D_{k,l+2} \\ D_{k,l+4} \\ D_{k,l+6} \\ D_{k,l+8} \\ D_{k,l+10} \\ D_{k,l+12} \\ D_{k,l+14} \\ D_{k,l+16} \\ D_{k,l+18} \\ D_{k,l+20} \\ D_{k,l+22} \\ D_{k,l+24} \\ D_{K,l=26} \\ D_{k,1+28} \\ D_{k,1+30} \\ \ldots \\ D_{k,l=94} \\ D_{k,l=96} \\ D_{k,l=98} \\ D_{k,l+100} \\ D_{k,l+102} \\ D_{k,l+104} \\ D_{k,l+106} \\ D_{k,l=108} \\ D_{k,l+110} \\ D_{k,l+112} \\ D_{k,l+114} \\ D_{k,l+116} \\ D_{k,l+118} \\ D_{k,l+120} \\ D_{k,l+122} \end{bmatrix} \quad V_Q = \begin{bmatrix} Q_{m,n} \\ Q_{m+3,n} \\ Q_{m+6,n} \\ Q_{m+9,n} \\ D_{m+12,n} \\ D_{m+15,n} \\ D_{m+18,n} \\ D_{m+21,n} \\ D_{m+24,n} \\ D_{m+27,n} \\ D_{m+30,n} \\ D_{m+33,n} \\ D_{m+36,n} \\ D_{m+39,n} \\ D_{m+42,n} \\ D_{m+45,n} \\ D_{m+48,n} \\ D_{m+51,n} \\ D_{m+54,n} \\ D_{m+57,n} \\ D_{m+60,n} \\ D_{m+63,n} \\ D_{m+66,n} \\ D_{m+69,n} \\ D_{m+72,n} \\ D_{m+75,n} \\ D_{m+78,n} \\ D_{m+81,n} \\ D_{m+84,n} \\ D_{m+87,n} \\ D_{m+90,n} \\ D_{m+93,n} \end{bmatrix}$$

supervisory data as indicated in FIG. 5 but only the sub-code bytes numbers 0 to 3 require mention. The sub-code bytes contain sub-code information arranged as sixteen 4-byte Pack Items. Each track contains 96 Fragments each with its own header incorporating one Pack Item and so each Pack Item is repeated six times on a track. In this implementation, Pack Item number 5 is dedicated to the track checksums, for tracks A and B, as shown in FIG. 6.

Accordingly, the device initially groups primary data into Basic Groups and which are then split into 22 Sub-Groups with each Sub-Group being written onto tape in a frame. Each frame consists of two tracks (A and B) each containing primary data plus other supervisory and error correction data added by the format. A Group on cape is made up of 22 frames plus an additional error correction code frame if C3 correction is implemented.

C3 parity bytes are computed across the 44 tracks within a Group, with one byte being taken from each track to produce a C3 codeword with two parity bytes. The C3 parity bytes are stored in the 23rd frame mentioned above which is appended to the Group on tape. The use of C3 is optional.

It should be noted that the generator polynomial for the C1 C2 and C3 codes has a root at $\alpha^0$ and so, in a good codeword, an XOR of all the bytes in the codeword will always give a zero result.

Accordingly, each Basic Group is transformed into 22 G4 Sub-Groups (or 23 if C3 correction present) with each G4 Sub-Group consisting of two tracks of 96 Fragments each.

The Fragments (with headers) are then subjected to 8 bit to 10 bit coding at a 8:10 encoder 26 and then written to tape in conventional manner.

On reading the data, use is made of the multi-level interleaved Reed-Solomon error correction coding to detect and correct errors in the data as read.

Reed-Solomon codes enable errors the within codewords read from tape to be corrected. During correction, a Reed-Solomon codeword with N parity bytes will always be corrected if $2e+v \leq N$, where 'e' is the number of random errors, and v is the number of errors in known locations within the codeword (erasures). If $2e+v>N$ the codeword will be uncorrectable and may be miscorrected. Miscorrections are undetectable during correction.

Many standard texts describe algorithms for correcting Reed-Solomon codewords, for example "Theory and Practice of Error Control Codes", Richard E Blahut, ISDN 0-201-10102-5, Addison-Wesley Publishing Company Inc., the contents of is which are incorporated herein by reference.

Examples of suitable algorithms include the Euclidean Division Algorithm.

When such algorithms are applied to a codeword, the result is either "correct" indicating the codeword is good and no corrections were made; "correctable" indicating that the codeword had errors which have been corrected by the algorithm; "miscorrected" indicating that the correct algorithm has corrected a codeword to produce a codeword which is valid but wrong; and "uncorrectable" indicating that the codeword is bad and has been identified as such by the algorithm. Miscorrections and uncorrectables are referred to as "failures".

In the Applicant's implementation of DDS3 C1 uncorrectable codewords are marked as erasures for C2 correction.

Referring to FIG. 4, it will be recalled that the C1 codewords have an interleave depth of 2 and run in the columns. If therefore the C2 correction algorithm identifies the first codeword in say Fragment 9, as an uncorrectable, this means that the bytes at even Serial Numbers in Fragment 9 can be marked as erasures in the corresponding C2 codewords in which they occur.

Miscorrections should also be detected (and corrected) by the next level. The multi-level interleaved error correct scheme therefore provides high tolerance to the errors in the data read from tape.

The Track Checksum is used as a final check of the Primary Data after C2 (if C3 is not used) or C3 correction. It is important that incorrect Primary Data is detected by the device reading the tape.

In the case where C3 is not used, uncorrectable C2 codewords can easily be detected when performing C2 correction. C2 miscorrections are undetectable during C2 correction however, and it is desirable that these are detected by the Track Checksums. The algorithm described for calculating the Track Checksum has no correlation with the Reed-Solomon codeword generation rules and therefore provides a reliable method for detecting C2 miscorrections.

In the case where C3 is used, it is desirable to mark C2 uncorrectable codewords and C2 miscorrections as erasures to C3 to enable the full power of the C3 code to be used in correction. Again, as the Track Checksum algorithm has no correlation with the Reed-Solomon codeword generation rules, this can be accomplished.

Accordingly, the data read from tape is subjected to 10:8 decoding by a decoder 28 to obtain the data Fragments including the Headers. The headers are extracted by a reformatter module 30 and the track checksum values retrieved by the track checksum checker 32. The data Fragments are then returned into G4 Sub-Group format by a G4 reformatter 34, and the G4 Sub-Group is then subjected to C1 and C2 correction algorithms to detect and where possible correct errors in the C1 and C2 codewords. This includes marking C1 uncorrectables as erasures to the C2 algorithm as described above to make good use of the power available from the six C2 parity bytes.

After C2 correction, if there is no C3 correction stage, codewords are returned to G1 Sub-Group format by reformatter modules 36 to 40. The track sums are recalculated and compared by the track sum checker 32 with those retrieved from the header to identify C2 miscorrections (C2 uncorrectables having been marked by the C2 correction algorithm).

If there is C3 correction then, following C1 and C2 correction, the track sum checker marks C2 miscorrections as erasures to the C3 correction algorithm module 42, thereby to provide the facility for the C3 correction algorithm to perform double error correction if two erasures are marked, allowing the full power of the C3 code to be used in correction. Thereafter the track checksum may be used on the C3 corrected data as a final data check.

ERROR CORRECTION FAILURES

The following analysis (valid for random errors only) indicates the improvement in the correction rates achieved by reliable marking of C2 miscorrections as erasures thereby allowing C2 double error correction.

P is defined as the probability of a random bit error in the channel and Pc1 as the probability of a good C1 correction.

$\overline{Pc1}$=1-Pc1, the probability of a C1 failure (a failure that can be an uncorrectable or a miscorrection). Pc2 and $\overline{Pc2}$ are similarly defined.

The C2 failure rate can be estimated by the following formula:

$$\overline{P_{c2}} = \begin{bmatrix} 32 \\ 7 \end{bmatrix} \overline{P_{c2}7} = \begin{bmatrix} 32 \\ 7 \end{bmatrix} \begin{bmatrix} 62 \\ 4 \end{bmatrix}^7 p^{28}$$

The assumption here is that erasures are not used in C1 correction (hence only 3 bytes can be corrected in a 62 byte C1 codeword). Table 1 shows figures for Pc2 for various values of p. The C1 error rate is also shown, i.e. the probability of a C1 codeword containing one or more errors.

TABLE 1

Probability of a C2 failure vs error rate

| p | C1 error rate | $\overline{Pc2}$ |
|---|---|---|
| $10^{-2}$ | 0.46 | $10*10^{-9}$ |
| $5*10^{-3}$ | 0.27 | $2.1*10^{-18}$ |
| $2*10^{-3}$ | 0.12 | $1.5*10^{-29}$ |
| $10^{-3}$ | 0.06 | $5.7*10^{-38}$ |

With C3 single error correct the C3 failure rate is given by:

$$\overline{P_{c3}}(1) = \begin{bmatrix} 46 \\ 2 \end{bmatrix} \overline{P_{c2}}2$$

With C3 double error correction, the C3 failure rate is given by:

$$\overline{P_{c3}}(2) = \begin{bmatrix} 46 \\ 3 \end{bmatrix} \overline{P_{c2}}3$$

Taking the top row from Table 1, the formulae above give the following figure for C2 failures:

TABLE 2

Probability of a C3 failure

| p | C1 error rate | Pc2 | Pc3 (1) | Pc3 (2) |
|---|---|---|---|---|
| $10^{-2}$ | 0.46 | $1*10^{-9}$ | $3.3*10^{-16}$ | $2.8*10^{-24}$ |

C3 double error correction then gives at least 8 orders of magnitude improvements in the failure rate (the other rows from Table 1 will show even better improvements), this is obviously a significant gain.

To calculate the overall gain from the above algorithm, it is necessary to determine the probability of C2 miscorrecting and this not being picked up in the checksum. This is the 'error rate' in the C2 erasure flags passed to C3. Table 1 above gives some worse case figures for C2 failures, but it is necessary to estimate what percentage of these are miscorrections. This is difficult to calculate but if it is assumed that the error locations produced in a miscorrection are random over the range 0–255, then the chance of 4 being in the range 0–31 (32 is the length of a C2 codeword) is $(32/256)^4=2.4*10^{-4}$. Based on this, Table 3 shows a comparison for the current (prior art) track checksum algorithm and the one described herein.

TABLE 3

C2 Flags Error Rate

| P | C1 error rate | Current (prior art) Checksums | New Checksums |
|---|---|---|---|
| $10^{-2}$ | 0.46 | $6*10^{-14}$ | $2*10^{-18}$ |

Accordingly, the above arrangement provides at least 4 orders of magnitude improvement over the existing scheme. It requires no extra bytes in the format. It is easy to implement in hardware because a 16 bit adder does not use many gates, and there is no interleaving.

What is claimed:

1. Apparatus for storing a stream of data records on magnetic media, said apparatus including:
   group formatting means for grouping said data records into groups of data bytes;
   sub-group processing means for dividing each of said groups into sub-groups, wherein each sub-group comprises data bytes corresponding to one or more data tracks;
   a track checksum calculating means for applying the data bytes from each said data track to a checksum algorithm to calculate one or more checksums for each data track,
   means for transforming each sub-group into at least one respective array, each corresponding to a data track,
   first error correction coding encoding means for encoding columns of each array to provide first ECC codewords comprising data bytes and parity bytes for causing first level correction of at least one of the data bytes in said first EEC codewords;
   second error correction coding encoding means for encoding rows of each array to provide second ECC codewords comprising data bytes and parity bytes for causing second level correction of at least one of the data bytes in said second ECC codewords, and wherein the data bytes and parity bytes making up any given second ECC codewords are in accordance with at least one predetermined ECC rule;
   the algorithm applied by said track checksum calculating means being such that it does not correlate with said predetermined ECC rule but is arranged to provide a checksum having the property that, on decoding of said ECC codewords and re-calculating and checking of the track checksum, the probability of a miscorrected codeword causing a track checksum failure is increased.

2. Apparatus according to claim 1, wherein both of the error correction encoding means apply Reed-Solomon coding, and said predetermined ECC rule is such as to cause all the bytes in a given codeword XOR to zero and the track checksum algorithm to be other than an XOR operation on the data bytes of said track or the logical equivalent thereof.

3. Apparatus according to claim 1, wherein each track checksum arithmetic addition of the data bytes in the track.

4. Apparatus according to claim 1, including means for transforming said encoded arrays to provide for each track a plurality of data fragments for being written on said magnetic media, and fragment header means for providing each of said data fragments with a fragment header, wherein at least some of said fragment headers include data bytes for identifying the corresponding track checksum for the current track.

5. Apparatus according to claim 4, including third error correction encoding means for computing codewords from respective corresponding byte positions across each of the tracks making up a group.

6. A method of storing a stream of data records on magnetic media, which comprises the steps of:
   grouping said data records into groups of data bytes,
   dividing each of said groups into sub-groups of data bytes, each sub-group corresponding to at least one data track;
   calculating one or more track checksums for each data track by applying the data bytes from each data track to a checksum algorithm;
   storing said one or more track checksums;
   transforming said sub-group into at least one respective array each corresponding to a data track;

encoding columns of each array to form first codewords comprising data bytes and parity bytes which result in a first level correction of at least one of the data bytes in said first ECC codewords;

encoding rows of said arrays to form second ECC codewords comprising data bytes and parity bytes which result in a second level correction of at least one of the data bytes in said second level ECC codewords, the data bytes and parity bytes making up any given ECC codeword being in accordance with at least one predetermined ECC rule;

the algorithm applied by said track checksum calculating step being such that it does not correlate with said predetermined ECC rules, but provides a checksum in which, on decoding of said ECC codewords and re-calculating and checking of the track checksum, the probability of a miscorrected codeword causing a track checksum failure is increased.

7. A method according to claim 6, wherein the rows and columns of said arrays are encoded said encoding steps apply Reed-Solomon coding and said predetermined ECC rule is such that all the bytes in a given codeword XOR to zero, and the track checksum is other than an XOR operation on the data bytes or said track of the logical equivalent thereof.

8. A method according to claim 7, wherein said track checksum is an arithmetic addition of the data bytes in the track.

9. A method according to claim 6, including computing codewords from corresponding byte positions across each of the tracks making up a group by applying a third error correction encoding step to the codewords.

10. A method according to claim 6 wherein said error encoding steps apply respective Reed-Solomon coding algorithms.

11. A method of reading data stored in accordance with the method of claim 6, which comprises retrieving data from tape, extracting therefrom said track checksums, decoding the codewords to obtain data bytes for each track, computing a track checksum for the decoded data bytes, and flagging a failure if said checksums do not agree.

12. A method according to claim 11, wherein said data includes three levels of error correction, and said track checksum is used after the second level of error correction to flag any second codeword failures thereby to identify and mark as erasures to the final level correction algorithm any data bytes in the third level codewords which correspond to a second level codeword failure.

13. Apparatus for storing a stream of data records on magnetic media, said apparatus including:

a group formatter for grouping said data records into groups of data bytes;

a sub-group processor for dividing each of said groups into sub-groups, wherein each sub-group comprises data bytes corresponding to one or more data tracks;

a track checksum calculator for applying the data bytes from each data track to a checksum algorithm to calculate one or more checksums for each data track, a first error correction coding encoder for encoding columns of each array to provide first ECC codewords comprising data bytes and parity bytes for causing first level correction of at least one of the data byte in said first ECC codewords;

a second error correction coding encoder for encoding rows of each array to provide second ECC codewords comprising data bytes and parity bytes for causing second level correction of at least one of the data bytes in said second ECC codewords, and wherein the data bytes and parity bytes making up any given second ECC codewords are in accordance with at least one predetermined ECC rule;

wherein the algorithm applied by said track checksum being such that it does not correlate with said predetermined ECC rule, but provides a checksum having the property that, on decoding of said ECC codewords and re-calculating and checking of the track checksum, the probability of a miscorrected codeword causing a track checksum failure is increased.

14. Apparatus according to claim 13, wherein both of the error correction encoders apply Reed-Solomon coding, and said predetermined ECC rule causes all the bytes in a given codeword XOR to zero and the track checksum algorithm being other than an XOR operation on the data bytes of said track or the logical equivalent thereof.

15. Apparatus according to claim 13, wherein each track checksum algorithm is an arithmetic addition of the data bytes in the track.

16. Apparatus according to claim 13, further including an array transformer for transforming said encoded arrays to provide for each track a plurality of data fragments adapted to be written on said magnetic media, and a fragment header provider for providing each of said data fragments with a fragment header, at least some of said fragment headers including data bytes for identifying the corresponding track checksum for the current track.

17. Apparatus according to claim 16, further including a third error correction encoder for computing codewords from respective corresponding byte positions across each of the tracks making up a group.

18. Apparatus for storing a stream of data records on magnetic media, the apparatus including a processor and a storage device, the processor being programmed to:

group said data records into groups of data bytes, divide each of said groups into sub-groups of data bytes, each sub-group corresponding to at least one data track;

calculate one or more track checksums for each data track by applying the data bytes from each data track to a checksum algorithm;

store said one or more track checksums in said storage device;

transform said sub-group into at least one respective array each corresponding to a data track;

encode columns of each array to form first codewords comprising data bytes and parity bytes which result in a first level correction of at least one of the data bytes in said first ECC codewords;

encode rows of said arrays to form second ECC codewords comprising data bytes and parity bytes which result in a second level correction of at least one of the data bytes in said second level ECC codewords, the data bytes and parity bytes making up any given ECC codeword being in accordance with at least one predetermined ECC rule;

the algorithm applied by said track checksum calculation being such that it does not correlate with said predetermined ECC rules, but provides a checksum in which, on decoding of said ECC codewords and re-calculating and checking of the track checksum, the probability of a miscorrected codeword causing a track checksum failure is increased.

19. The apparatus of claim 18, wherein said column and row are arranged to cause encoding Reed-Solomon coding to be applied and said predetermined ECC rule is such that all the bytes in a given codeword XOR to zero, and the track checksum is other than an XOR operation on the data bytes or said track of the logical equivalent thereof.

20. The apparatus of claim 19, wherein said track checksum is an arithmetic addition of the data bytes in the track.

21. The apparatus of claim 18, wherein the processor is programmed to compile codewords from corresponding byte positions across each of the tracks making up a group by applying a third error correction encoding step to the codewords.

22. The apparatus of claim 18 wherein said processor is programmed to cause Reed-Solomon coding algorithms to be performed for the error encoding.

23. The apparatus of claim 18 wherein the processor is programmed to retrieve data from tape, extract therefrom said track checksums, decode the codewords to obtain data bytes for each track, compute a track checksum for the decoded data bytes, and flag a failure if said checksums do not agree.

24. The apparatus of claim 23, wherein said data includes three levels of error correction, and said processor is programmed to cause the track checksum to be used after the second level of error correction to flag any second codeword failures thereby to identify and mark as erasures to the final level correction algorithm any data bytes in the third level codewords which correspond to a second level codeword failure.

* * * * *